3,519,478
PAPER IMPREGNATION WITH BLOCKED URETHANE PREPOLYMERS

Charles H. Howell, Jr., Newark, N.J., assignor to Diamond Shamrock Corporation, Cleveland, Ohio, a corporation of Delaware
No Drawing. Continuation-in-part of application Ser. No. 525,303, Feb. 7, 1966. This application Jan. 10, 1969, Ser. No. 790,478
Int. Cl. B44d 1/46; B32b 27/10
U.S. Cl. 117—155                                          1 Claim

ABSTRACT OF THE DISCLOSURE

A paper substrate is treated with an aqueous emulsion containing a urethane prepolymer having blocked isocyanate groups capable of being unblocked, a surfactant and water and thereafter heated to unblock the blocked urethane prepolymer and to cure the resulting unblocked prepolymer.

CROSS-REFERENCE TO RELATED APPLICATIONS

This application is a continuation-in-part of my copending application Ser. No. 525,303, Howell, Jr., filed Feb. 7, 1966, now abandoned.

BACKGROUND OF THE INVENTION

This invention relates to a novel process for impregnating and curing paper substrates and more particularly to paper substrates impregnated and cured with an emulsion of a urethane prepolymer having blocked isocyanate groups capable of being unblocked.

For many applications conventional paper substrates such as paper or paper board are lacking in a number of properties, especially in very low wet tensile strength, wet stiffness and in poor dimensional stability under the conditions of widely varying relative humidities present in the atmosphere under conditions of use. Numerous treatments have been proposed for improving these physical properties of paper substrates such as paper and paper board, but none of these has been entirely satisfactory. Lattices of synthetic rubber or natural rubber are frequently used to treat paper substrates but paper substrates treated with these lattices have poor light stability. Paper and paper board treated with these lattices discolor rapidly upon exposure to natural light, especially direct sunlight. In U.S. Pat. 3,178,310, it has been proposed to treat paper with aqueous polyurethane coating emulsions to improve the wet tensile strength as well as the ply adhesion of dry paper. However, the compositions described have only a very limited stability. They must be used within 24 hours of their preparation, preferably within 8 hours. Even within this short time, the chemical composition of the emulsions changes. Thus the desired improvements sought on the paper are materially decreased as the age of the treating composition increases even within the very short time limits specified.

It is an object to provide paper substrates such as paper and paperboard having improved physical properties such as wet tensile strength, wet stiffness, dimensional stability and light stability.

It is another object of the present invention to provide for treating and curing paper substrates such as paper and paper board to improve their physical properties. It is a further object to provide for treating paper substrates such as paper and paper board with emulsions of urethane prepolymers having blocked isocyanate groups capable of being unblocked and curing the treated substrates. It is a further object to provide for treating paper substrates such as paper and paper board with emulsions of urethane prepolymers having blocked isocyanate groups capable of being unblocked which have indefinite storage stability, in excess of two years. Other objects will become apparent from the detailed description given hereinafter. It is intended, however, that the detailed description and specific examples do not limit the invention but merely indicate preferred embodiments thereof since various changes and modifications within the scope of the invention will become apparent to those skilled in the art.

The above and other objects have been most unexpectedly and successfully achieved in the following manner, i.e., by treating and curing paper and paper board with emulsions of urethane prepolymers having blocked isocyanate groups capable of being unblocked hereinafter referred to as emulsions of blocked urethane prepolymers to improve their physical properties. One important feature of this invention is the outstanding storage stability of these emulsions of blocked urethane prepolymers. They are stable for indefinite periods of time, in excess of two years. These emulsions may be prepared just prior to treating the paper and paper board at the plant site or may be prepared elsewhere, if more convenient, at any time before use and shipped by conventional commercial means. I have further discovered that paper and paper board so treated have improved physical properties such as wet tensile strength, wet stiffness and dimensional stability. Furthermore, I have unexpectedly discovered that paper and paper board so treated has improved light stability.

The paper substrates are treated by immersing them in or passing them through a bath containing the emulsion or by spraying them with the emulsion. Any excess emulsion may be removed by blotting or by blowing with air or more conveniently by passing between the nip of squeeze rolls. The amount of pickup will be determined by a number of factors, such as the porosity of the paper substrate, the absorptivity of the paper substrate, the concentration of the nonvolatile portion of the emulsion, by the effectiveness with which the excess emulsion has been removed.

By dry-pickup I mean the weight of nonvolatile portion of the emulsion of the blocked urethane prepolymer which has been added to weight of the dry paper substrate treated by the processes of this invention. The nonvolatile portion of the emulsion composition includes the blocked urethane prepolymer, the surfactant, curing polyols, if present and curing catalyst, if present.

The paper substrates impregnated or saturated with the emulsions of blocked urethane prepolymers are then cured by heating between 150° F. and 400° F., preferably between 200° F. and 400° F., for a period of time between one-half minute and twenty minutes. By curing I mean unblocking the blocked urethane prepolymer and reacting the resulting unblocked isocyanate terminated prepolymer with the cellulose in the paper substrate, with moisture already present or absorbed from the atmosphere, with curing polyols, if present, or by self-polymerization of isocyanate groups to dimer and trimer structures to form high molecular weight, crosslinked insoluble, infusible, polymeric polyurethanes. The above cure is obtained by heating at the specified conditions of temperature and time.

The curing portion of the process may be carried out in conventional equipment available in commercial practice. The paper substrates may be cured by contacting with heated surfaces, such as conveyors, drums or rollers. Alternatively they may be cured by the heat radiated by infrared lamps. Another convenient method for curing is to allow the paper substrate to contact circulating streams of hot air or other gases, where the air or other gases is heated to the desired temperature in external equipment by conventional methods and circulated in the presence of the paper substrate.

The paper or paper board which is impregnated by the process of this invention is unsized paper or paper board, that is, paper or paper board which has not been treated by incorporation of agents, such as rosin, hydrocarbons and natural waxes, starches, sodium silicate, glue, casein, synthetic resins or latices of synthetic rubber or natural rubber, to render them water-repellent and water-impermeable. The types of unsized paper which can be used include bleached ground wood type, unbleached sulfite type, semi-bleached sulfite type, bleached sulfite type, neutral sulfite type, unbleached sulfate type, semi-bleached sulfate type, bleached sulfate, also known as bleached kraft, soda pulp type and semi-chemical pulp type. Although I prefer to use unsized paper and paper board, paper or more specifically paper board having one or more plies rosin sized by conventional processes may also be employed. It is to be understood that the term "paper" as used herein includes not only dry sheeting, but also the "wet web" stock newly formed in a paper-making machine.

The process of the present invention is carried out by impregnating paper substrates such as paper and paper board with an aqueous emulsion of a blocked urethane prepolymer containing a surfactant and water. If desired, the emulsion may also contain one or more solvents and one or more curing polyols. The aqueous blocked urethane prepolymer emulsion contains a nonvolatile portion and a volatile portion. The nonvolatile portion of the emulsion includes one or more blocked urethane prepolymers, one or more surfactants, and, if desired, one or more curing polyols as well as other nonvolatile components such as nonvolatile catalysts, other nonvolatile additives, and the like. By the term nonvolatile portion of the emulsion, I means that the nonvolatile components present in the nonvolatile portion of the emulsion are not volatilized and removed from the impregnated paper substrate when it is heated between about 150° F. and about 400° F. during the curing cycle. The volatile portion of the emulsion includes water, one or more volatile solvents as well as other volatile components such as volatile catalysts, other volatile additives and the like. By the term volatile portion of the emulsion, I mean that the volatile components present in the volatile portion of the emulsion are volatilized and removed from the impregnated paper substrate by volatilization either before or during the curing cycles, that is, the volatile components are vaporized and removed at temperatures of about 400° F. or lower. If desired, the volatile components may be removed by vacuum distillation or vacuum drying.

Impregnation of the paper substrate with the aqueous emulsion of blocked urethane prepolymer is regulated to obtain a dry pickup of from about 1% to about 150% by weight of the nonvolatile portion of the aqueous emulsion based on the weight of the untreated paper substrate. This is done in the following manner. The weight percent of the nonvolatile portion present in the aqueous emulsion is determined. Then, sufficient amounts of the emulsion are deposited upon the substrate so as to finally deposit an amount of emulsion sufficient to leave upon the substrate the required amount of nonvolatiles to obtain the desired dry pickup.

The aqueous emulsions may be applied to the paper substrate by any of the methods described above. The desired dry pickup on the paper substrate may be obtained by a single application of the aqueous emulsion or by successive applications of the emulsion to the paper substrate. If desired, the impregnated paper substrate may be dried between successive applications of the aqueous emulsion of the blocked urethane prepolymer emulsion provided the temperatures and time intervals of the drying operation are not sufficient to cause unblocking of the blocked urethane prepolymer and/or any other reactions with the blocked urethane prepolymer. The aqueous emulsions of blocked urthane propolymer emulsions have the further advantages that the components of the nonvolatile portion of the emulsion have an affinity for paper substrates and dilute emulsions of blocked urethane prepolymers may be employed in the impregnation.

After the required amount of the aqueous emulsion of the blocked urethane prepolymer has been applied to the paper substrate to obtain the desired dry pickup, the impregnated paper substrate is then heated at a temperature of about 150° F. to about 400° F. for about ½ minute to about 20 minutes to unblock the blocked urethane prepolymer and to cure the resulting unblocked urethane prepolymer so that cured impregnated paper substrates having greatly improved wet tensile strength, wet stiffness, dimensional stability and light stability are obtained.

Aqueous emulsions which may be employed in the present invention contain a nonvolatile portion having from about 0.35% to about 75% by weight of one or more blocked urethane prepolymers, from about 0.01% to about 10% by weight of one or more surfactants, and from 0% to about 65% by weight of one or more curing polyols and a volatile portion having from about 0% to about 25% by weight of one or more volatile solvents and from about 15% to about 99.64% by weight of water.

The urethane prepolymers utilized herein are the reaction products of hydroxy terminated polyols including polyethers or hydroxy terminated polyesters with excess polyisocyanate thus yielding isocyanate terminated prepolymers. Quantities of reactants are selected to provide a ratio of isocyanate to hydroxyl groups of 2:1 to 1.1:1. The hydroxy terminated polyethers and polyesters which form the backbone of the prepolymer may be linear or branched. The hydroxy terminated polyols have molecular weights ranging from about 50 to about 5000 while the hydroxy terminated polyesters have molecular weights ranging from about 200 to about 5000.

These prepolymers are subsequently reacted with moisture, either added or absorbed from the atmosphere, or with added polyhydroxy containing compounds, referred to as curing polyols, or with themselves by polymerization reaction to form high molecular weight, crosslinked, insoluble polyurethane polymers. Because of their reactivity with reactive hydrogen containing materials, e.g., water and the curing polyols, these prepolymers are first reacted with certain types of reactive hydrogen compounds, referred to as blocking agents, to form addition products which are insensitive to water, curing polyols, etc. or other active hydrogen compounds at room temperature thereby allowing for formation of stable compositions at temperature of up to about 150° F. These blocked prepolymers have limited thermal stability. On heating above 150° F., the blocked urethane prepolymers decompose to regenerate the prepolymer containing reactive isocyanate (NCO) groups. These blocked prepolymers are prepared by reacting the isocyanate terminated prepolymers with blocking agents in a molar ratio of reactive NCO/active hydrogen of blocking agent of 1/1 to 1/2. The blocking reaction is generally carried out at elevated temperatures of about 50 to 125° C. and may require the use of a catalyst such as a tertiary amine.

Organic solvents may be used to improve the handling characteristics of the prepolymers and of the blocked prepolymers. Such solvents include esters, ethers, etheresters, ketones, chlorinated hydrocarbons, aromatic hydrocarbons and mixtures of aromatic hydrocarbons with aliphatic hydrocarbons and other materials not containing active hydrogen atoms or other groups reactive with isocyanates. The amount of solvent that may be used ranges from 0% to about 33⅓% based upon the weight of the blocked prepolymer. Exemplary of useful solvents are methyl ethyl ketone, methyl isobutyl ketone, diisobutyl ketone, ethyl acetate, butyl acetate, Cellosolve acetate (ethoxyethyl acetate), carbitol acetate (ethoxyethoxyethyl acetate), methylene chloride, dichloroethylene, tetrachloroethane, perchloroethylene, benzene, toluene, xylene, mixtures of these compounds and their mixtures as well as mixtures of aromatic hydrocarbons such as benzene, toluene, xylene and the like containing small amounts of aliphatic solvents such as mineral spirits, Stoddard solvent, VMP naphtha and the like.

Curing agents or curing polyols and mixtures of same such as polyhydroxy compounds may be added for reaction with the unblocked prepolymer during the curing reaction. These curing agents are frequently called curing polyols and are linear or branched polyhydroxy terminated polyethers or polyesters and also include the lower di and polyhydroxy organic compounds. The quantities of curing polyols used are chosen to provide an isocyanate to hydroxyl ratio of about 1/1 to about 10/1. Curing polyols are not necessarily essential in the curing process since the unblocked prepolymer may be allowed to react with the moisture in the air or moisture deliberately added to the system or by self polymerization to form dimers and trimers. Examples of curing polyols are simple polyols such as glycols, e.g., ethylene glycol and propylene glycol as well as other polyols such as glycerol, trimethylolpropane, hexanetriol, pentaerythritol and the like as well as mono-ethers such as diethylene glycol, tripropylene glycol and the like and polyethers, i.e., alkylene oxide condensates of the above. Among the alkylene oxides that may be condensed with these polyols to form polyethers are ethylene oxide, propylene oxide, butylene oxide, styrene oxide and the like. These polyols are generally called hydroxy terminated polyethers and can be linear or branched. Examples of polyethers include polyoxyethylene glycol having a molecular weight of 1540, polyoxypropylene glycol having a molecular weight of 1025, polyoxytetramethylene glycol, polyoxyhexamethylene glycol, polyoxyoctamethylene glycol, polyoxynonamethylene glycol, polyoxydecamethylene glycol, polyoxydodecamethylene glycol and mixtures thereof. Other types of polyoxyalkylene glycol ethers can be used. For example polyacetals having hydroxy groups and molecular weights of more than 200 can be prepared when an aldehyde and an alcohol such as formaldehyde and ethylene glycol are used. It is also to be understood that polyethers prepared by reacting alkylene oxides with mononuclear polyhydroxybenzenes such as resorcinol, pyregallol, phloroglucinol, hydroquinone, 4,6-di-t-butylcatechol, catechol, orcinol, and other alkylated polyhydroxybenzenes may also be used. Likewise polyethers prepared by reacting alkylene oxides with alkylolated hydroxybenzenes and alkylolated polyhydroxybenzenes as well as Novolaks can be used. Additionally, polyesters having at least two terminal hydroxy groups may be used as curing polyols.

To speed up the curing reaction catalysts may be added to the system. Such catalysts are well known and include compounds such as tertiary amines, for example triethylamine, triethylenediamine, N-ethyl morpholine and the like, lead salts such as lead octoate, lead naphthenate and the like, tin salts such as stannous octoate.

The hydroxy terminated polyols including polyethers which are reacted with excess polyisocyanates to form isocyanate terminated prepolymers may be simple polyols such as glycols, e.g., ethylene glycol and propylene glycol as well as other polyols such as glycerol, trimethylopropane, hexanetriol, pentaerythritol, and the like as well as mono-ethers such as diethylene glycol, tripropylene glycol and the like and polyethers, i.e., alkylene oxide condensates of the above. Among the alkylene oxides that may be condensed with these polyols to form polyethers are ethylene oxide, propylene oxide, butylene oxide, styrene oxide and the like. These are generally called hydroxy terminated polyethers and can be linear or branched. Examples of polyethers include polyoxyethylene glycol having a molecular weight of 1540, polyoxypropylene glycol having a molecular weight of 1025, polyoxytetramethylene glycol, polyoxyhexamethylene glycol, polyoxyoctamethylene glycol, polyoxynonamethylene glycol, polyoxydecamethylene glycol, polyoxydodecamethylene glycol and mixtures thereof. Other types of polyoxyalkylene glycol ethers can be used. For example polyacetals having hydroxyl groups and molecular weights of more than 200 can be prepared when an aldehyde and an alcohol such as formaldehyde and ethylene glycol are used. It is also to be understood that polyethers prepared by reacting alkylene oxides with mononuclear polyhydroxybenzenes such as resorcinol, pyrogallol, phloroglucinol, hydroquinone, 4,6-t-butylcatechol, catechol, orcinol, and other alkylated polyhydroxybenzenes may also be used. Likewise polyethers prepared by reacting alkylene oxides with alkylolated hydroxybenzenes and alkylolated polyhydroxybenzenes as well as Novolaks may be used.

Hydroxy terminated polyesters and mixtures of same which can be used instead of or in conjunction with the hydroxy terminated polyols in preparing isocyanate terminated prepolymers include, for example, those formed by reacting organic aliphatic, cycloaliphatic or aromatic di- or polycarboxylic acids, or their ester forming derivatives thereof such as anhydrides, acid halides and the like with polyols. These hydroxyl terminated polyesters must have at least two terminal hydroxyl groups. They may also be prepared by known transesterification methods. Acids useful for preparing such polyesters include maleic, azelaic, itaconic, citraconic, succinic, adipic, suberic, sebacic, o-phthalic, isophthalic, terephthalic and hexahydroterephthalic acids, their anhydrides and the alkyl unsaturated and halogen substituted derivatives of these acids as well as their homologues. Other typical acids include hydroxy acids containing from 15 to 20 carbon atoms such as hydroxy palmitic acids, hydroxy stearic acids, ricinoleic acid and the like. Other dibasic acids include dimer acids such as the dimerized unsaturated acids chosen from the octadecadienoic acids preferably from the 9,12-octadecadienoic acid (linoleic acid) to form dilinoleic acids. The dilinoleic acids are prepared by the Diels-Alder reaction. Various fats and oils such as castor oil, soybean oil and the like can also be used. Useful polyols for preparing the polyesters are low molecular weight polyols such as ethylene glycol, diethylene glycol, triethylene glycol, 1,4-butylene glycol, 1,3-butylene glycol 1,6-hexanediol and their mixtures; glycerol, trimethylolethane, trimethylolpropane, 1,2,6-hexanetriol, pentaerythritol, dipentaerythritol, tripentaerythritol, polypentaerythritol, sorbitol, methyl glucosides, sucrose and the like as well as reaction products of the above mentioned polyols with alkylene oxides such as ethylene oxide, propylene oxide, their mixtures and the like.

Examples of useful polyisocyanates for preparing the prepolymers include tolylene-2,4-diisocyanate, tolylene-2,6-diisocyanate, tolylene diisocyanate (65% 2,4; 35% 2,6), tolylene diisocyanate (80% 2,4; 20% 2,6), 1,6-hexamethylenediisocyanate (HDI),
1,4-tetramethylenediisocyanate,
hexamethylene diisocyanate,
1,10-decamethylenediisocyanate,
1,5-naphthalenediisocyanate (NDI),
cumene-2,4-diisocyanate,
4-methoxy-1,3-phenylenediisocyanate,
4-chloro-1,3-phenylenediisocyanate,
4-bromo-1,3-phenylenediisocyanate,
4-ethoxy-1,3-phenylenediisocyanate,
2,4'-diisocyanatodiphenylether,
diphenyl methane-4,4'-diisocyanate (MDI),
5,6-dimethyl-1,3-phenylenediisocyanate,
2,4-dimethyl-1,3-phenylenediisocyanate,
4-isopropyl-1,3-phenylene diisocyanate,
4,4'-diisocyanatodiphenylether, benzidinediisocyanate,
o-nitrobenzidene diisocyanate,
4,6-dimethyl-1,3-phenylenediisocyanate, 9,10-anthracene diisocyanate,
4,4'-diisocyanatodibenzyl,
3,3-dimethyl-4,4'-diisocyanatodiphenylmethane,
2,6-dimethyl-4,4'-diisocyanatodiphenyl,
2,4-diisocyanatostilbene,
4,4'-diphenyl diisocyanate (XDI),
3,3'-dimethyl-4,4-diphenyl diisocyanate (TODI),
3,3'-dimethoxy-4,4'-diphenyl diisocyanate (DADI),
1,4-anthracenediisocyanate,
mesitylene diisocyanate,
durylene diisocyanate,
2,5-fluorenediisocyanate,
1,8-naphthalenediisocyanate,
2,6-diisocyanatobenzofuran,
2,4,6-toluenetriisocyanate,
tritolylmethane triisocyanate,
2,4,4'-triisocyanatophenyl ether,
4,4'-methylene-bis-(cyclohexyl isocyanate), and DDI, a diisocyanate derived from dimer acids containing 36 carbon atoms and manufactured by General Mills. Another useful isocyanate (PAPI-I) has the general formula

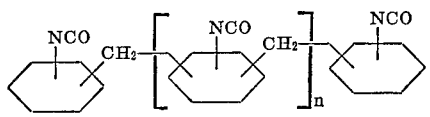

where $n$ has an average value of about 1. Mixtures of polyisocyanates may also be used.

Blocking agents which can be used for blocking the isocyanate terminated prepolymers include phenol, ortho, meta, para cresols and mixtures thereof, xylenols, resorcinol, hydroquinone, catechol, guaiacol, naphthols, alkylphenols such as butylphenols, octylphenol, nonylphenol, 2,4-diisobutylphenol, and the like, 4-hydroxybiphenyl, 6-hydroxytetralin, bisphenols such as isopropylidene-4,4'-bisphenol, lactams such as α-pyrrolidone, epsilon-caprolactam, oximes such as methyl ethyl ketone oxime, acetone oxime, cyclohexanone oxime, hydroxylamine, hydrogen cyanide, sodium bisulfite, tertiary butanol, diethyl malonate, ethyl acetoacetate, ethyl cyano acetate, 2,4-pentadione, acetylacetone, diphenylamine, monomethylaniline, aryl mercaptans, alkyl mercaptans, 1-phenyl-3-methyl-5-pyrazolone and the like.

Emulsification of the blocked prepolymers, to which curing polyols and catalysts may be added if desired, are most generally accomplished with the aid of a surfactant or a mixture of surfactants as emulsifier permitting the formation of a stable oil-in-water emulsion. Without such surfactants, the emulsions will have only very limited stability. Any surfactant can be used herein except those which may prematurely react with a blocked prepolymer thereby destroying this composition. The preferred surfactants are those generally classified as nonionic, alone or in admixture with anionic surfactants. These include the polyalkylene oxide condensates of alkylated phenols, polyalkylene glycol esters of saturated and unsaturated fatty acids having from about 8 to 30 carbon atoms in the fatty acid portion, block copolymers consisting of polypropylene oxide and polyethylene oxide blocks referred to as Pluronics whose molecular weights may range from about 600 to about 100,000. The Tergitol surfactants which are polyalkylene glycol ethers, sold by the Union Carbide Corporation have molecular weights ranging from about 1,000 to about 50,000. Spans and Tweens such as sorbitan monooleate, sorbitan monolaurate, sorbitan monopalmitate, sorbitan monostearate, sorbitan tristearate, sorbitan trioleate, polyoxyethylene sorbitan monolaurate, polyoxyethylene sorbitan monopalmitate, polyoxyethylene sorbitan monostearate, and the like may also be used as emulsifiers and dispersants. Specific examples are Span 20, Span 40, Span 60 and Span 85 and Tween 20, Tween 40, Tween 60 and Tween 80.

Among the anionic surfactants which may be used in conjunction with the nonionic surfactants are the sodium and potassium sulphonates of alkyl benzenes, alkyl naphthalenes; sodium and potassium salts of naphthalenes, alkylnaphthalenes and alkyl benzenes condensed with formaldehyde; sodium and potassium sulfates of linear and branched alcohols; sodium and potassium sulfates of alkylene oxide condensates of alkylphenols; sodium and potassium sulfates of alkylene oxide condensates of alcohols; alkyl esters of sodium or potassium sulfo succinates, and the like. The corresponding phosphonate and phosphate esters may also be used. The amount of surfactant may range from about 0.01% to about 10% by weight of the emulsion.

The above surfactants and surfactant mixtures include those having cloud points from about 5° C. to over 100° C. with the preferred cloud point range being from about 50° C. to over 100° C. The term cloud point of over 100° C. is well known in the surfactant art and means that the surfactant solution does not cloud at the boiling point of the surfactant solution.

Emulsification can be achieved by any of the well known methods. For example, the blocked prepolymer, with or without solvent, may be added with suitable agitation to a solution or suspension of the surfactant in water. Curing polyols, if used, may be dissolved or dispersed in the blocked prepolymer portion or in the aqueous phase before emulsification. Alternatively, the aqueous phase may be added to the blocked prepolymer portion. Curing polyols, if used, may be dissolved or dispersed in the blocked prepolymer portion or in the aqueous phase before emulsification. The surfactant may be dissolved or dispersed in either the aqueous phase or the blocked prepolymer portion. Preferably, the surfactant and curing polyols, if any, are dissolved or suspended in the blocked prepolymer portion and the aqueous phase is then added to this mixture with suitable agitation to form the emulsion. To prepare the emulsions, mechanical equipment commonly used in emulsification such as mixers, colloid mills, homogenizers, ultrasonic mixers and the like may be used. In preparing the emulsions, temperatures between 5° and about 50° C. may be used so long as unblocking of the prepolymer does not occur. The emulsion may contain from about 0.4% to 85% by weight of nonvolatiles, viz, the blocked prepolymer, surfactant, curing polyols if any and other additives, the balance being water plus whatever solvent may have been used.

The stability of the emulsion system may also be enhanced by the incorporation therein of 0.25 to 3 parts by weight of a colloid stabilizer per 100 parts by weight of the emulsion system. Colloid stabilizers which may be used for this purpose include silicon dioxide, carboxy methyl cellulose, polymethacrylates, hydroxyethyl cellulose, methyl cellulose and Carbopol 934 which is a water soluble polymer of acrylic acid crosslinked with 1% of polyallylether of sucrose averaging 5.8 allyl groups per sucrose molecule.

The emulsions may then be applied to the appropriate substrate and then dried and cured by heating to a temperature above 150° F., preferably about 200° to about 400° F. for periods of from about ½ minute to about 20 minutes. If desired, the emulsion may be applied to the substrate and dried at a lower temperature and then stored so that the uncured blocked urethane prepolymer remains in an unchanged form until a subsequent time when the curing reaction is carried out in the above indicated times and temperatures to form high molecular weight crosslinked, insoluble, infusible polyurethane polymers. The above curing times and temperature ranges are applicable to emulsions with and without curing catalysts. In the curing process the blocked prepolymer is dissociated to the unblocked isocyanate containing urethane prepolymer and the blocking agent is removed from the system by volatilization. The regenerated isocyanate terminated prepolymer then reacts with the curing polyol if present or with moisture either deliberately added or absorbed from the atmosphere. Alternatively, the regenerated isocyanate terminated urethane prepolymers may react with each other via isocyanate polymerization reactions such as dimerization and trimerization reactions. In all of the above curing reactions high molecular weight crosslinked, infusible and insoluble polyurethane polymer compositions are formed on the appropriate substrate. The resulting cured polyurethanes have outstanding abrasion resistance, resistance to organic solvents and to chemical solutions such as acids, bases and the like.

For a fuller understanding of the nature and objects of this invention, reference may be made to the following examples which are given merely to illustrate the present invention and are not to be construed in a limiting sense. All weights, parts and proportions in these examples are by weight unless otherwise indicated.

EXAMPLE I

Preparation of a blocked prepolymer

A mixture of 32.5 g. (0.25 mole) dipropylene glycol, 786 g. (0.5 mole) of a propylene oxide condensate of trimethylolpropane having a molecular weight of 1570, 261 g. (1.5 moles) of tolylene diisocyanate containing 80% 2,4-isomer and 20% 2,6-isomer and 360 g. of methyl ethyl ketone as a solvent were reacted under a nitrogen blanket and anhydrous conditions at 70–75° C. for twenty hours. The resulting reaction product was an isocyanate terminated urethane prepolymer having 3.05% by weight of reactive isocyanate groups dissolved in methyl ethyl ketone. After cooling to 65° C., 98.5 g. (1.05 moles) of phenol, 2.8 g. (0.018 mole) of N,N-diethylcyclohexylamine as a catalyst and 150 g. of methyl ethyl ketone as a solvent were added to the resulting reaction product and reacted at 75–78° C. for five hours to obtain a yellow, viscous solution containing 70% by weight of a phenol blocked urethane prepolymer.

EXAMPLE II

Preparation of a blocked prepolymer and curing polyol composition

A mixture of 130.6 g. (0.124 mole) of a polypropylene glycol having a molecular weight of 1060, 8.35 g. (0.061 mole) of trimethylolpropane, 18.0 g. (0.043 mole) of a propylene oxide condensate of trimethylolpropane having a molecular weight of 420 and 14.4 g. (0.02 mole) of a propylene oxide condensate of trimethylolpropane having a molecular weight of 722, 86.6 g. of xylene as a solvent, 86.6 g. of Cellosolve acetate as a solvent and 87.0 g. (0.5 mole) of tolylene diisocyanate containing 80% 2,4-isomer and 20% 2,6-isomer were reacted under a nitrogen blanket and anhydrous conditions at 50–95° C. for five hours. The resulting reaction product was an isocyanate terminated prepolymer having 3.6% by weight of reactive isocyanate groups dissolved in xylene and Cellosolve acetate. To this solution of prepolymer, 83.5 g. (0.74 mole) of epsilon-caprolactam was added and reacted for five hours at 80–105° C. to obtain a caprolactam blocked prepolymer. The resulting solution was cooled to 40° C. and contained 66.5% by weight of caprolactam blocked urethane prepolymer. 22.3 g. (0.072 mole) of a propylene oxide condensate of trimethylolpropane having a molecular weight of 310 and 56.5 g. (0.036 mole) of a propylene oxide condensate of trimethylolpropane having a molecular weight of 1565 were then added as curing polyols to the solution of the caprolactam blocked prepolymer to obtain a caprolactam blocked urethane prepolymer and curing polyol composition.

EXAMPLE III

Preparation of a blocked prepolymer

A mixture of 241 g. (0.08 mole) of a propylene oxide condensate of trimethylolpropane having a molecular weight of 3000 and 42 g. (0.24 mole) of tolylene diisocyanate containing 80% 2,4-isomer and 20% 2,6-isomer were reacted under a blanket of nitrogen and anhydrous conditions at 90° C. until the resulting reaction product was an isocyanate terminated prepolymer having 3.8% by weight of reactive ioscyanate groups. 24 g. (0.255 mole) of phenol and 0.6 g. (0.004 mole) of N,N-diethylcyclohexylamine as a catalyst were added to the prepolymer and reacted at 80–85° C. for five hours to obtain a phenol blocked urethane prepolymer.

EXAMPLE IV

Preparation of a blocked prepolymer

A mixture of 34.5 g. (0.2 mole) of tolylene diisocyanate containing 80% 2,4-isomer and 20% 2,6-isomer, 30 g. (0.04 mole) of a propylene oxide condensate of trimethylolpropane having a molecular weight of 725 and 10.4 g. (0.025 mole) of a propylene oxide condensate of trimethylolpropane having a molecular weight of 423, 10 g. of xylene as a solvent and 15 g. of Cellosolve acetate as a solvent were reacted under a blanket of nitrogen and anhydrous conditions at 40–55° C. until the resulting reaction product was an isocyanate terminated prepolymer having 8.3% by weight of reactive isocyanate groups dissolved in xylene and Cellosolve acetate. 22.6 g. (0.2 mole) of epsilon-caprolactam, 0.20 g. (0.0013 mole) of N,N-diethylcyclohexylamine as a catalyst and 16 g. of Cellosolve acetate as a solvent were added to the prepolymer solution and reacted at 65–70° C. for about fourteen hours to obtain a 70% by weight solution of a caprolactam blocked urethane prepolymer.

EXAMPLE V

Preparation of a blocked prepolymer

A mixture of 34.5 g. (0.2 mole) of tolylene diisocyanate containing 80% 2,4-isomer and 20% 2,6-isomer, 30 g. (0.04 mole) of a propylene oxide condensate of trimethylolpropane having a molecular weight of 725 and 10.4 g. (0.025 mole) of a propylene oxide condensate of trimethylolpropane having a molecular weight of 423, 10 g. of xylene as a solvent and 15 g. of Cellosolve acetate as a solvent were reacted under a blanket of nitrogen and anhydrous conditions at 40–55° C. until the resulting reaction product was an isocyanate terminated prepolymer having 8.3% by weight of reactive isocyanate groups dissolved in xylene and Cellosolve acetate. 19 g. (0.2 mole) of phenol, 0.20 g. (0.0013 mole) of N,N-diethylcyclohexylamine as a catalyst and 15 g. of Cellosolve acetate as a solvent were added to the prepolymer solution obtained above and were reacted at 65–70° C. for about four hours to obtain a 70% by weight solution of the phenol blocked urethane prepolymer.

EXAMPLE VI

Preparation of a blocked polyester prepolymer

A mixture of 63.6 g. of adipic acid, 50.2 g. of diethylene glycol and 1.8 g. of trimethylolpropane was reacted at 235–240° C. to obtain a water-white, viscous liquid polyester having an acid value of less than 3, a moisture content of less than 0.1% by weight and a hydroxyl number of 60–65. A mixture of 53.5 g. of the above polyester, 10.6 g. of tolylene diisocyanate containing 80% 2,4-isomer and 20% 2,6-isomer and 30 g. of methyl ethyl ketone as a solvent were reacted under a nitrogen blanket and under anhydrous conditions at 65–70° C. until the resulting reaction product was an isocyanate terminated prepolymer having 3.5% by weight of reactive isocyanate groups dissolved in methyl ethyl ketone. To this solution of prepolymer, 5.4 g. of phenol and 0.2 g. of N,N-diethylcyclohexylamine as a catalyst were added and reacted at 75–85° C. for four hours. A viscous light yellow solution containing 70% by weight of a phenol blocked polyester urethane prepolymer was obtained.

EXAMPLE VII

Preparation of an emulsion of a blocked prepolymer 28 g. of water were added with vigorous agitation to a mixture of 25.1 g. of the caprolactam blocked prepolymer solution obtained in Example IV, 1.5 g. of xylene as a solvent, 4.5 g. of a propylene oxide condensate of trimethylolpropane having a molecular weight of 725, 1.6 g. of propylene oxide condensate of trimethylolpropane having a molecular weight of 440 and 1.6 g. of Pluronic L-64 which is a nonionic surfactant obtained by condensing ethylene oxide with polypropylene glycol and having an average molecular weight of 2900 and a cloud point of about 59° C. in a 10% by weight solution in distilled water thereby forming a white, stable dilutable oil-in-water emulsion.

EXAMPLE VIII

Preparation of an emulsion of a caprolactam blocked prepolymer and curing polyol composition To a mixture of 42.7 g. of the caprolactam blocked prepolymer solution obtained in Example IV, 7.5 g. of a propylene oxide condensate of trimethylolpropane having a molecular weight of 725 as a curing polyol, 2.6 g. of a propylene oxide condensate of trimethylolpropane having a molecular weight of 440 as a curing polyol, 2.5 g. of xylene as a solvent and 1 g. of Tergitol XD which is a polyalkylene glycol ether surfactant and has a hydroxyl number of about 18 and a cloud point of 60–65° C. in a 0.5% by weight solution in distilled water were added 43.5 g. of water with vigorous agitation to yield a white, stable, dilutable oil-in-water emulsion.

EXAMPLE IX

Preparation of an emulsion of a phenol blocked prepolymer and curing polyol composition To a mixture of 52.5 g. of the phenol blocked prepolymer solution obtained in Example V, 3.3 g. xylene as a solvent, 9.8 g. of a propylene oxide condensate of trimethylolpropane having a molecular weight of 725 as a curing polyol, 3.4 g. of a propylene oxide condensate of trimethylolpropane having a molecular weight of 440 as a curing polyol and 2.8 g. of Tergitol XD which is a polyalkylene glycol ether surfactant and has a hydroxyl number of about 18 and a cloud point of 60–65° C. in a 0.5% by weight solution in distilled water were added 28.2 g. of water with vigorous agitation to form a white, stable, dilutable oil-in-water emulsion.

EXAMPLE X

Preparation of an emulsion of a caprolactam blocked prepolymer and curing polyol composition To a mixture of 49.5 g. of the caprolactam blocked prepolymer solution obtained in Example IV, 8.9 g. of a propylene oxide condensate of trimethylolpropane having a molecular weight of 740 as a curing polyol, 3.1 g. of a propylene oxide condensate of trimethylolpropane having a molecular weight of 423 as a curing polyol, 3.2 g. of Tergitol XD which is a polyalkylene glycol ether surfactant and has a hydroxyl number of about 18 and a cloud point of 60–65° C. in a 0.5% by weight solution in distilled water and 0.6 g. of an 80% by weight aqueous solution of dioctyl sodium sulfosuccinate which is an anionic surfactant were added 32 g. of water with vigorous agitation to yield a white, stable, dilutable oil-in-water emulsion.

EXAMPLE XI

Preparation of an emulsion of a phenol blocked prepolymer 64 g. of water were added with vigorous agitation to a mixture of 61 g. of the phenol blocked prepolymer obtained in Example III and 3.2 g. of Tergitol XD which is a polyalkylene glycol ether surfactant and has a hydroxyl number of about 18, a cloud point of 60–65° C. in a 0.5% by weight solution in distilled water thereby forming a white, stable, dilutable oil-in-water emulsion.

EXAMPLE XII

Preparation of an emulsion of a phenol blocked prepolymer 94 g. of water were added with vigorous agitation to a mixture of 117 g. of the phenol blocked prepolymer solution obtained in Example I and 4 g. of Tergitol XD which is a polyalkylene glycol ether surfactant and has a hydroxyl number of about 18 and a cloud point of 60–65° C. in a 0.5% by weight solution in distilled water thereby forming a white stable, dilutable oil-in-water emulsion of the phenol blocked prepolymer.

EXAMPLE XIII

Preparation of an emulsion of a phenol blocked prepolymer and a curing polyol composition To a mixture of 57 g. of the phenol blocked prepolymer solution obtained in Example I, 2.55 g. of N-benzyldiethanolamine as a curing polyol and 2.14 g. of Tergitol XH which is a polyalkylene glycol ether surfactant having a cloud point of 90° to 100° C. in a 0.5% by weight solution in distilled water were added 38 g. of water with vigorous agitation to yield a white, stable, dilutable oil-in-water emulsion.

EXAMPLE XIV

Preparation of an emulsion of a phenol blocked prepolymer and curing polyol composition To a mixture of 282 g. of the phenol blocked prepolymer solution obtained in Example I, 13 g. of a propylene oxide condensate of trimethylolpropane having a molecular weight of 340 as a curing polyol and 18 g. of Tergitol XD which is a polyalkylene glycol ether surfactant and has a hydroxyl number of about 18 and a cloud point of 60–65° C. in a 0.5% by weight solution in distilled water were added 257 g. of water with good agitation to yield a white, stable, dilutable oil-in-water emulsion.

EXAMPLE XV

Preparation of an emulsion of a phenol blocked prepolymer 100 g. of the emulsion obtained in Example XII was charged to a round bottom flask equipped with a sealed stirrer and connected to a condenser, receiver and vacuum source. While stirring the emulsion, a vacuum was applied to the system (20 mm. Hg pressure) and the solvent, methyl ethyl ketone was distilled off the emulsion and collected in the receiver. After all of the methyl ketone had been distilled off of the emulsion and collected in the receiver, the vacuum source was disconnected and the system was brought to atmospheric pressure. Sufficient water was added to the emulsion to replace the solvent and water removed during the vacuum distillation and to form 100 g. of emulsion again. Comparison of the reconstituted emulsion with the emulsion obtained in Example XII showed that the properties of the reconstituted emulsion were identical to those of the emulsion obtained in Example XII except that the reconstituted emulsion did not contain an organic solvent.

EXAMPLE XVI

Preparation of an emulsion of a caprolactam blocked prepolymer and curing polyol composition 42.0 g. of water were added with vigorous agitation to a mixture of 55.5 g. of the caprolactam blocked prepolymer and curing polyol composition obtained in Example II and 2.5 g. of Tergitol XD which is a polyalkylene glycol ether surfactant and has a cloud point of 60–65° C. in a 0.5% by weight solution in distilled water thereby forming a white, stable, dilutable oil-inwater emulsion of the caprolactam blocked prepolymer and curing polyol composition.

EXAMPLE XVII

Preparation of an emulsion of a caprolactam blocked prepolymer and curing polyol composition To a mixture of 55.5 g. of the caprolactam blocked prepolymer and curing composition obtained in Example II and 2.5 g. of Pluronic F–68 which is a nonionic surfactant obtained by condensing ethylene oxide with polypropylene glycol having a molecular weight of 8200 and a cloud point of over 100° C. in a 10% by weight solution to distilled water were added 42 g. of water with vigorous agitation to form a white, stable, dilutable oil-in-water emulsion of the caprolactam blocked prepolymer and curing polyol composition.

EXAMPLE XVIII

Preparation of an emulsion of a caprolactam blocked prepolymer and curing polyol composition To a mixture of 55.5 g. of the caprolactam blocked prepolymer and curing polyol composition obtained in Example II and 2.5 g. of a nonionic surfactant obtained by condensing nine moles of ethylene oxide with one mole of octylphenol and having a cloud point of 50° to 55° C. in a 1% by weight solution in distilled water were added 42.0 g. of water with vigorous agitation to form a white, stable, dilutable oil-in-water emulsion of the caprolactam blocked prepolymer and curing polyol composition.

EXAMPLE XIX

Preparation of an emulsion of a phenol blocked polyester prepolymer 44 g. of water were added with vigorous agitation to a mixture of 71.5 g. of the phenol blocked polyester prepolymer solution obtained in Example VI and 3 g. of Tergitol XD which is a polyoxyalkylene glycol ether surfactant and has a hydroxyl number of about 18 and a cloud point of 60–65° C. in a 0.5% by weight solution in distilled water to obtain a white, stable, dilutable oil-in-water emulsion of a phenol blocked polyester prepolymer.

EXAMPLE XX

Dilution of an emulsion of a phenol blocked prepolymer and curing polyol composition with water 1 g. of the emulsion of Example XIV was diluted with 99 g. of water to form a diluted emulsion which remained stable for a period in excess of 3 days. This diluted emulsion remained uniform, showing no tendency to develop layers of oil or cream during the extended storage. This diluted emulsion contained 0.4% by weight of nonvolatiles, including 0.35% by weight of blocked urethane prepolymer, 0.023% by weight of curing polyol and 0.032% by weight of surfactant.

EXAMPLE XXI

Impregnation and curing of paper with an emulsion of a caprolactam blocked prepolymer and curing polyol The emulsion of the caprolactam blocked prepolymer and curing polyol composition obtained in Example VIII was used in a Black-Clawson paper saturator to impregnate a 35 pound basis weight (3,000 sq. ft.) paper sheet. In like manner, another sample of the same paper was impregnated with Hycar 1562, a commercially avialable smulsion of a butadine-acrylonitrile copolymer. In both instances, an add-on of 50% dry, that is, a dry pickup of 50% by weight of the nonvolatile portion of the emulsion based on the weight of the paper, was sought. The sheet impregnated with the blocked urethane prepolymer emulsion weigher 50.4 lbs., a 44% dry pickup. The sheet impregnated with the Hycar emulsion weighed 53.8 lbs., a 54% dry pickup. The impregnated sheets were cured for 90 seconds at 200° F., stored at room temperature and then tested 48 hours later. The wet tensile strength of the cured paper which was impregnated with the blocked urethane prepolymer emulsion was materially improved, especially, when compared with the results obtained with the Hycar 1526 treated paper. Hycar 1526 is used commercially to upgrade the wet tensile strength of paper. Results of these tests are shown in the table below:

TABLE

|  | Control (untreated paper) | | Paper treated with— | | | |
| --- | --- | --- | --- | --- | --- | --- |
|  | | | Hycar 1562 | | Emulsion of Example VIII | |
|  | Machine Direction | Cross Direction | Machine Direction | Cross Direction | Machine Direction | Cross Direction |
| Wet tensile strength, p.s.i. | 1.1 | 0.8 | 3 | 2.7 | 4.9 | 3.3 |

In addition, exposure of samples of the two treated papers in a Fade-o-meter for 100 hours showed that paper impregnated and cured with the blocked urethane prepolymer emulsion exhibited little, if any, discoloration whereas paper treated with the Hycar emulsion had discolored considerably and was light brown in shade. These tests demonstrated the greatly improved light stability obtained on paper treated with the blocked urethane prepolymer emulsions.

EXAMPLE XXII

Treatment of paper board with an emulsion of a caprolactam blocked prepolymer and curing polyol The emulsion of the caprolactam blocked prepolymer and curing polyol composition obtained in Example VIII was used to impregnate a 63 lb. carrier paper board using an immersed roll applicator. The impregnated paper board was then passed between squeeze rolls so that a 6% by weight dry pickup of the nonvolatile portion of the emulsion based on the weight of the untreated paper board was obtained. The impregnated paper board was then cured in two passes through a drying oven, a section of which was heated to about 360° F. by infrared lamps with the remaining section employing heated air at about 400° F. The total drying time was about 30–40 seconds. The cured treated paper board had excellent dimensional stability, that is, it did not show any changes in dimensions upon exposure to atmospheric conditions of widely varying relative humidities. Furthermore, the cured treated paper board had greatly improved wet tensile strength and wet stiffness.

What is claimed is:

1. A process for impregnating paper substrate of paper or paper board which comprises:
   (a) applying to said paper substrate an aqueous emulsion comprising:
      (1) from about 0.35% to about 75% by weight of one or a mixture of nonvolatile urethane prepolymers having blocked isocyanate groups capable of being unblocked,
(2) from about 0.01% to about 10% by weight of nonvolatile surfactant selected from the group consisting of nonionic surfactants, anionic surfactants and their mixtures,
(3) from 0% to about 65% by weight of one or a mixture of nonvolatile curing polyols,
(4) from 0% to about 25% by weight of one or a mixture of organic solvents free of isocyanate reactive groups, and
(5) from about 15% to about 99.64% by weight of water, and thereafter
(b) unblocking said blocked isocyanate groups in said urethane prepolymer and curing the resulting unblocked prepolymer by heating said coated paper substrate at a temperature of about 150° F. to about 400° F. for about ½ minute to about 20 minutes so that a dry pickup of from about 1% to about 150% by weight of said nonvolatile portion of said aqueous emulsion, based on the weight of the untreated paper substrate, is obtained.

References Cited

UNITED STATES PATENTS

| | | | |
|---|---|---|---|
| 3,178,310 | 4/1965 | Berger et al. | 117—155 X |
| 3,245,961 | 4/1966 | Fetscher et al. | 117—161 X |
| 3,267,079 | 8/1966 | Bolinger | 117—161 X |
| 3,360,394 | 12/1967 | Griffin et al. | 117—161 X |

WILLIAM D. MARTIN, Primary Examiner

M. R. LUSIGNAN, Assistant Examiner